US00RE42430E

(19) United States
(12) Reissued Patent
Carlsruh et al.

(10) Patent Number: US RE42,430 E
(45) Date of Reissued Patent: Jun. 7, 2011

(54) DIMENSIONING SYSTEM AND METHOD OF DIMENSIONING

(75) Inventors: Eve A. Carlsruh, Layton, UT (US); Craig R. Bailey, Mantua, UT (US); Robert L. Kennington, Kaysville, UT (US); Marie L. Midboe, Salt Lake City, UT (US); Clark P. Skeen, Ogden, UT (US); Brian H. Smith, Farmington, UT (US); Brandon M. Taylor, Kaysville, UT (US)

(73) Assignee: Quantronix, Inc., Farmington, UT (US)

(21) Appl. No.: 12/496,227

(22) Filed: Jul. 1, 2009

Related U.S. Patent Documents

Reissue of:
(64) Patent No.: 6,850,464
Issued: Feb. 1, 2005
Appl. No.: 10/358,574
Filed: Feb. 5, 2003

(51) Int. Cl.
*G01B 5/26* (2006.01)

(52) U.S. Cl. ..... 367/99; 702/156

(58) Field of Classification Search ..... 367/99, 367/128; 702/156, 159
See application file for complete search history.

(56) References Cited

U.S. PATENT DOCUMENTS

| | | | | | |
|---|---|---|---|---|---|
| 3,527,336 | A | | 9/1970 | Johnston | |
| 4,871,052 | A | | 10/1989 | Huber | |
| 5,042,015 | A | * | 8/1991 | Stringer | 367/99 |
| 5,105,392 | A | * | 4/1992 | Stringer et al. | 367/99 |
| 5,220,536 | A | * | 6/1993 | Stringer et al. | 367/99 |
| 5,422,861 | A | * | 6/1995 | Stringer et al. | 367/99 |
| 5,505,291 | A | | 4/1996 | Huang et al. | |
| 5,606,534 | A | * | 2/1997 | Stringer et al. | 367/128 |
| 5,850,370 | A | * | 12/1998 | Stringer et al. | 367/128 |
| 5,914,463 | A | | 6/1999 | Dlugos | |
| 6,064,629 | A | * | 5/2000 | Stringer et al. | 367/128 |
| 6,298,009 | B1 | * | 10/2001 | Stringer | 367/99 |
| 6,611,787 | B2 | * | 8/2003 | Stringer et al. | 702/159 |
| 6,850,464 | B2 | * | 2/2005 | Carlsruh et al. | 367/99 |
| 2004/0151068 | A1 | * | 8/2004 | Carlsruh et al. | 367/99 |

FOREIGN PATENT DOCUMENTS

| | | | |
|---|---|---|---|
| AU | 2004212123 | | 6/2009 |
| CA | 2509504 | * | 1/2006 |
| EP | 1202027 | A1 | 5/2002 |
| EP | 1590627 | A1 | 11/2005 |
| NZ | 0541547 | A | 4/2010 |
| WO | 92/16818 | | 10/1992 |
| WO | WO9216818 | * | 10/1992 |

(Continued)

OTHER PUBLICATIONS

Fairbanks Controls Operation, Operator's Manual, 1985, 7 pages.

(Continued)

*Primary Examiner* — Dan Pihulic
(74) *Attorney, Agent, or Firm* — TraskBritt

(57) ABSTRACT

A method and apparatus for dimensioning and, optionally, weighing a cuboidal object. Four distance sensors are employed, one downwardly facing the top of the object, one facing one side thereof and two respectively facing mutually parallel sides of the object perpendicular to the one side. Distances are measured between the sensors and the top and sides of the object and subtracted from known distances to determine the length, width, height and spatial volume of the object. The object may be weighed as it is being dimensioned. Spatial volume and a "dim weight" for the object may be calculated.

35 Claims, 6 Drawing Sheets

FOREIGN PATENT DOCUMENTS

| | | | | |
|---|---|---|---|---|
| WO | WO 9216818 | A1 | * | 10/1992 |
| WO | WO2004072578 | A1 | | 8/2004 |

OTHER PUBLICATIONS

PCT Search Report and Written Opinion for PCT/US2004/001,355, mailed Jul. 21, 2004, 9 pages.
Complaint against all defendants. Filed by Quantronix, Inc. Assigned to Judge Donovan W. Frank per Patent List and referred to Magistrate Judge Arthur J. Boylan. (Includes Exhibits A-D). Filed Apr. 6, 2007, 67 pages.
Answer to Complaint by Wildwood Technology, LLC. Filed Apr. 26, 2007, 15 pages.
Answer to Complaint by Data Trak Solutions NA, Inc. Filed May 4, 2007, 16 pages.
Memorandum in Support re Motion for Preliminary Injunction filed by Quantronix, Inc. Filed Jun. 11, 2007, 36 pages.
Declaration of Robert L. Kennington in Support of Motion for Preliminary Injunction filed by Quantronix, Inc. (Includes Exhibits A-D). Filed Jun. 11, 2007, 14 pages.
Declaration of Mark E. Schafer in Support of Motion for Preliminary Injunction filed by Quantronix, Inc. (Includes Exhibits A-E). Filed Jun. 11, 2007, 15 pages.
Declaration of Clark Skeen in Support of Motion for Preliminary Injunction filed by Quantronix, Inc. (Includes Exhibits A-N). Filed Jun. 11, 2007, 15 pages.
Memorandum in Opposition re Motion for Preliminary Injunction filed by all defendants. Filed Jul. 6, 2007, 21 pages.
Declaration of Michael S. Sherrill in Support of Memorandum in Opposition to Motion filed by all defendants. Filed Jul. 6, 2007, 2 pages.
Declaration of Robert Tessier in Support of Memorandum in Opposition to Motion filed by all defendants. Filed Jul. 6, 2007, 6 pages.
Reply re Motion for Preliminary Injunction filed by Quantronix, Inc. Filed Jul. 16, 2007, 18 pages.
Second Declaration of Mark E. Schafer in Support of Motion for Preliminary Injunction filed by Quantronix, Inc. Filed Jul. 16, 2007, 6 pages.
Order granting Motion for Preliminary Injunction and denying Motion for a Stay of Litigation (Written Opinion). Signed by Judge Donovan W. Frank Aug. 1, 2007, 18 pages.
Affidavit of Kathryn K. Smith in Support of Motion to Amend/Correct Defendants' Prior Art Statement filed by all defendants. (Includes Exhibit A). Filed Feb. 6, 2009, 23 pages.
Affidavit of Kathryn K. Smith in Support of Motion to Amend/Correct Defendants' Prior Art Statement filed by all defendants. Filed Feb. 6, 2009, 3 pages.
Order on Stipulated Motion for Entry of Consent Judgment, Permanent Injuction and Dismissal of the Action re Stipulation filed by Quantronix, Inc. Signed by Judge Donovan W. Frank May 19, 2009, 6 pages.

* cited by examiner

DIMENSIONING SYSTEM AND METHOD OF DIMENSIONING

Matter enclosed in heavy brackets [ ] appears in the original patent but forms no part of this reissue specification; matter printed in italics indicates the additions made by reissue.

BACKGROUND OF THE INVENTION

The present invention relates generally to methods and apparatus for taking dimensional measurements of objects and, more specifically, to a method and apparatus for ascertaining dimensional measurements and, optionally, spatial volumes and weights of objects.

Millions of packages per year are handled and shipped by United Parcel Service, Federal Express, and many other smaller courier and delivery services. These packages originate with federal, state, and local governments as well as private businesses of all sizes. In many instances, the charges by the carriers to their customers are based on the so-called "dim-weight factor" or "dimensional weight factor" (DWF) of the article being shipped, a fictitious dimension based on length (L) times width (W) times height (H) in inches divided by a standard agency or association-recognized divisor or conversion factor, commonly 166 (L×W×H÷166) for international shipments and 194 (L×W×H÷194) for domestic U.S. shipments. The "166" and "194" divisors or conversion factors have been recognized and adopted by the International Air Transport Association (I.A.T.A.). Even if an object or package is of irregular configuration, the "dim weight," using the longest measurement each of length, width, and height, is still utilized for billing purposes. The volume computed by multiplication of object length times width times height may hereinafter be termed the "cubic volume," "spatial volume," or simply the "cube" of the object.

The measurements of the articles shipped are also critical so that the carrier can accurately determine the number of trucks, trailers, or other vehicles which will be required to transport goods to their destinations and so both customers and carriers can accurately estimate their warehousing and other storage needs.

In addition, article weight and measurements are also used to determine and predict weight and balance for transport vehicles and aircraft and to dictate the loading sequence for objects by weight and dimensions for maximum safety and efficiency.

Further, if orders of any items are to be packed into boxes, knowledge of object weight and dimensions would be useful for selecting box size and durability.

In the past, it was a common practice for the customer to manually "cube" or measure boxes or other articles with a ruler, yardstick, or other straightedge marked with units of length, generally inches, perform a calculation for "dim weight," and provide same to the carrier with the package. If the customer did not "cube" the articles, then the carrier performs the operation. Since these measurements and calculations were generally done hurriedly, there was an equal chance that the customer would be undercharged or overcharged. To add to the problem, there are many packages and other objects not susceptible to even a grossly accurate manual measurement of dim weight, for example and not by way of limitation, loaded pallets, tubes, drums, reels of hose, cable or wire, etc. Many machine and automotive parts are shipped "naked" with tags attached or, at most, bagged or shrink wrapped. It is obvious to one skilled in the art that a straightedge measurement to ascertain the greatest extent of each dimension will not be accurate in any of these instances to any degree whatsoever.

It is known to the inventors that a "jig"-type measuring system for packages has been used, with a base and two sides joining in a corner at 90° angles, each marked with gross dimensional units (to the nearest one inch) so that a cubic package can be placed on the base at the corner and measurements taken manually by looking at the markings and recording same, but, again, the accuracy is limited by the care and eyesight of the measurer, and the time utilized is unreasonably long when thousands of packages are being shipped, as with Sears, K-Mart, or other large retailers.

In short, a quick, accurate means and method for determining the dimensions and the cubic volume or spatial volume of packages and other objects in a commercial or industrial setting have been lacking for many situations.

U.S. Pat. No. 5,042,015, assigned to the assignee of the present application and the disclosure of which is incorporated herein by reference, discloses practical and commercially successful means and methods for such object measuring of both stationary and moving objects.

U.S. Pat. No. 5,105,392, assigned to the assignee of the present application and the disclosure of which is incorporated herein by reference, provides alternatives and improvements to the system of the '015 patent. The '392 patent discloses and claims a method and apparatus for three-dimensional measurement of large and irregular objects, such as palletized loads. The '392 patent also discloses and claims a method and apparatus for determining the actual length and width dimensions of randomly aligned, linearly moving rectangular objects by determining apparent length, apparent width, and the distance between an object corner facing to the side of the travel direction and the trailing edge of the object. These measurements are then employed to determine the actual object length and width via trigonometrically based mathematical equations.

The methodology for moving object measurement as described in the '392 patent has been proven to be sound, as have the mathematical relationships, and has also been applied in U.S. Pat. No. 5,220,536, assigned to the assignee of the present application and the disclosure of which is incorporated herein by reference. The '536 patent discloses and claims a method and apparatus for determining the length, width and height of randomly aligned packages and other substantially rectangular objects by utilization of a combination of a light curtain and an ultrasonic distance sensor.

U.S. Pat. No. 5,422,861, assigned to the assignee of the present application and the disclosure of which is incorporated herein by reference, discloses an object location or detection system for proper placement of an object to be measured on the platen or other object support surface of a measuring system, the use of waveguides as standoffs and received-wave isolators for reflected-wave sensors, and also an improved autocalibration method for ultrasonic sensors.

U.S. Pat. Nos. 5,606,534 ('534 patent), 5,850,370, 6,064,629 and 6,298,009, all assigned to the assignee of the present invention and the disclosure of each of which is incorporated herein by reference, disclose and claim laser-based dimensioning systems for stationary and in-motion applications. One exemplary embodiment of the invention of the '534 patent comprises a static or stationary measurement unit, wherein three emitter-receiver laser sensor units are supported on a sensor support assembly in mutually perpendicular orientation and aimed toward a common point. The parcel or other object to be measured is placed on a horizontal platen supported by a load cell or other suitable weighing device, the platen being isolated from the sensor support assembly for greater sensitivity and accuracy in weight determination.

In operation, the three laser sensor units are fired sequentially to prevent interference between reflected light, each laser beam being reflected from a side of the parcel and reflected nonspecularly, the reflection being focused through a lens and ambient light filter associated with the receiver unit, which preferably includes a transversely extending CCD linear image sensor. The distance between the face of a sensor unit and the side of the parcel at which it is aimed affects the angle of reflection of the laser beam, and thus the location of the focused, filtered, reflected beam on the image sensor. Pixel locations on the CCD can be correlated to sensor-to-object distances via a curve fit and linear fifth-order polynomial equation, or via a lookup table. Thus, since the distance is known between each sensor unit and a zero point at which the far corner of parcel is located, each dimension of the parcel may be readily ascertained by subtracting the known distance from the sensor-to-object distance.

Another exemplary embodiment of the invention of the '534 patent comprises a dynamic or in-motion dimensioning system which uses at least one and preferably two emitter-receiver laser sensor units as previously described, one placed to each side of the path of movement of an object moving linearly at a known constant rate, to measure the length and width of the object. The height of the object may be measured by a third, downwardly facing laser sensor unit suspended over the object's path or by other means known in the art, such as a light curtain or ultrasonic sensor, if the object is cuboidal. The in-motion dimensioning system as desired may be used, as with the stationary embodiment, to measure dimensions and volume of cuboidal objects as well as the gross or spatial volume of other, irregular objects. However, the in-motion system also possesses the capability to determine the actual outline of objects of irregular shape, since repeated sampling of the distances between the sensor units and a moving object will produce a scan of the outline or footprint of the object. Further, if desired, more than one downwardly facing sensor may be employed, and the sensors placed at nonperpendicular orientation to the object path, so as to provide the capability of better definition of the object volume outline being scanned.

While all of the foregoing dimensioning methods and apparatus have advanced the state of the art, there remains an area which is presently inadequately served by conventional dimensioning equipment. Specifically, there is a need for the ability to dimension cuboidal objects other than those placed on a motorized conveyor but at a greater speed and with the same accuracy as is possible to effectuate with conventional stationary object dimensioning equipment. Stated another way, conventional stationary object dimensioning equipment requires alignment of a [cuboidial] *cuboidal* object with a corner of a jig for accurate length, width and height measurements. This, of course, requires manual lifting of the object, placement on the jig platen, aligning the object into the corner, triggering the dimensioning (and weighing) operating sequence of the equipment, and then manually lifting the object off of the platen and placing it on a dolly, pallet or other carrier for further handling. The conventional stationary object dimensioning equipment also restricts the size and weight of objects which may be dimensioned and weighed, due to OSHA restrictions and the natural limitations of human strength and flexibility.

SUMMARY OF THE INVENTION

The present invention comprises an apparatus and method for determining the dimensions and, optionally, spatial volume and weight of a cuboidal object.

The apparatus of the present invention comprises a platform configured as a scale table, a first, downwardly facing distance sensor disposed above the surface of the platform, a second distance sensor at one side of the platform and facing laterally thereacross, and third and fourth distance sensors substantially facing each other and facing substantially longitudinally along an opposing side of the platform from the second distance sensor. A longitudinally extending, vertical alignment surface is located along the side of the platform at which the third and fourth sensors are placed. The platform may be supported by one or more weight sensors, for example, in the form of load cells.

The apparatus of the present invention is particularly well suited for receiving packages or other cuboidal objects for dimensioning and weighing from an unpowered, roller-type conveyor assembly having a surface at substantially the same elevation as that of the platform of the apparatus of the present invention, so that an operator may slide objects from the conveyor surface to the platform without the necessity of lifting. Object movement on the platform may be further facilitated by the incorporation of rotatably mounted transfer balls therein and protruding upwardly therefrom.

The method of the present invention comprises placing a cuboidal object on a surface of a platform, aligning mutually perpendicular sides of the cuboidal object to be respectively perpendicular to a downwardly facing first distance sensor, a second distance sensor facing across the platform from one side thereof, and third and fourth distance sensors placed on opposing, mutually parallel sides of the cuboidal object perpendicular to the one side thereof. A distance between the first distance sensor and the top of the cuboidal object is measured and subtracted from a known distance between the first distance sensor and the platform surface to determine object height, the distance between the second distance sensor and a side of the cuboidal object is measured and subtracted from a known distance between the second distance sensor and an alignment surface opposing the second distance sensor to determine object width, and distances between the third and fourth distance sensors and opposing, mutually parallel sides of the cuboidal object are measured and subtracted from a known distance between the third and fourth sensors to determine object length. The cuboidal object may be weighed substantially concurrently with being dimensioned. The spatial volume of the [cuboidial] *cuboidal* object may be determined, as may the "dim weight" of the object as previously defined herein.

BRIEF DESCRIPTION OF THE DRAWINGS

The present invention will be more fully understood by one skilled in the art through a review of the following detailed description of the preferred embodiments taken in conjunction with the accompanying drawings wherein.

DETAILED DESCRIPTION OF THE ILLUSTRATED EMBODIMENT

Ultrasound technology is extremely safe, emitting no radiation; visible, ultraviolet, or infrared light; audible sound; odor; or heat. Further, ultrasound, as used in the present invention, will not damage a package or its contents during the measurement operation. Finally, an ultrasonic distance sensor of the type utilized in the present invention has no moving parts and is essentially maintenance free.

The currently preferred ultrasonic transducers or distance sensors employed with the present invention are electrostatic, although piezoelectric transducers may be employed. The preferred electrostatic sensors operate at a frequency of 50 kHz. Suitable sensors are available from the STI Automation Sensors operating unit of Scientific Technologies, Inc. (Fremont, Calif.) located in Logan, Utah.

It is also contemplated that laser rangefinder-type distance sensors may be employed in lieu of ultrasonic distance sensors in implementing the present invention, but such an approach would, of course, be more complex and expensive. U.S. Pat. No. 5,606,534, the disclosure of which has been previously incorporated herein by reference, describes a laser rangefinder-type distance sensor suitable for use in implementing the present invention.

Figure 4:
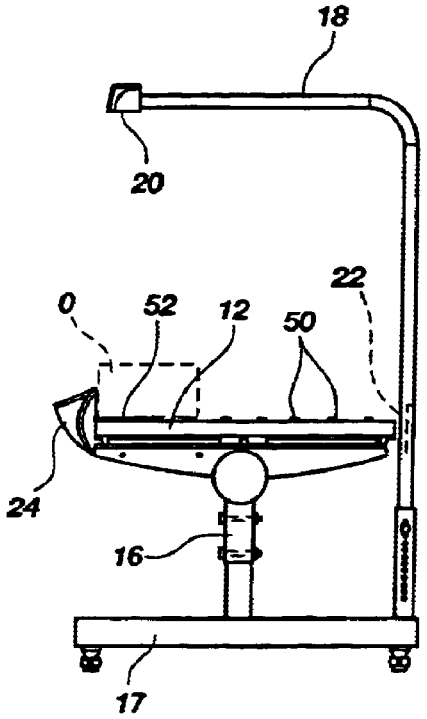
FIG. 4 comprises an end elevation of the embodiment of FIG. 1.

Referring now to FIGS. 1 through 4 of the drawings, respectively comprising perspective, top, side and end views of an exemplary embodiment of the invention are depicted. Apparatus 10 of the present invention comprises a platform 12 in the form of a rigid scale table supported on two load cells 14 (see FIG. 5) carried by support assembly 16, which rests on base assembly 17. Base assembly 17 also supports overhead arm unit 18, which rises substantially vertically from behind platform 12 and extends thereover to a location proximate and opposing a side of platform 12. Support assembly 16 and overhead arm unit 18 are both height-adjustable within a preselected range, as best shown in FIG. 4. First, downwardly facing distance sensor 20 is carried at the distal end of overhead arm unit 18. Second, laterally oriented distance sensor 22 is carried on a plate extending between the tubular members of overhead arm unit 18 and faces across platform 12, in parallel to the upper portion of overhead arm unit 18. A longitudinally extending control panel housing 24, also supported by support assembly 16, is located along the side of the platform 12. Longitudinally extending control panel housing 24 includes an elongated aperture therein along the platform side thereof to accommodate edge housing 26, providing a vertical alignment surface 28 and third and fourth distance sensors 30 and 32 (see FIG. 5), which are substantially mutually facing, carried by lateral extensions of platform 12 and may be angled slightly outwardly away from control panel housing 24 toward platform 12. It should be noted that edge housing 26 defines a longitudinal channel running alongside platform 12 to accommodate the ultrasonic beams emanating from third and fourth distance sensors 30 and 32 toward a cuboidal object placed therebetween and the resulting beams reflected from the object.

As may best be illustrated in FIG. 4, platform 12 resides between overhead arm unit 18 and control panel housing 24, but is not secured to either, instead resting directly on support assembly 16 through load cells 14. A slight vertical lip 34 (see FIGS. 1 and 5) runs longitudinally along one side of platform 12 to prevent packages and other cuboidal objects to be dimensioned from extending over that side, while vertical alignment surface 28 acts, among other things, to prevent such packages and objects from extending over the other side of platform 12.

Figure 5:
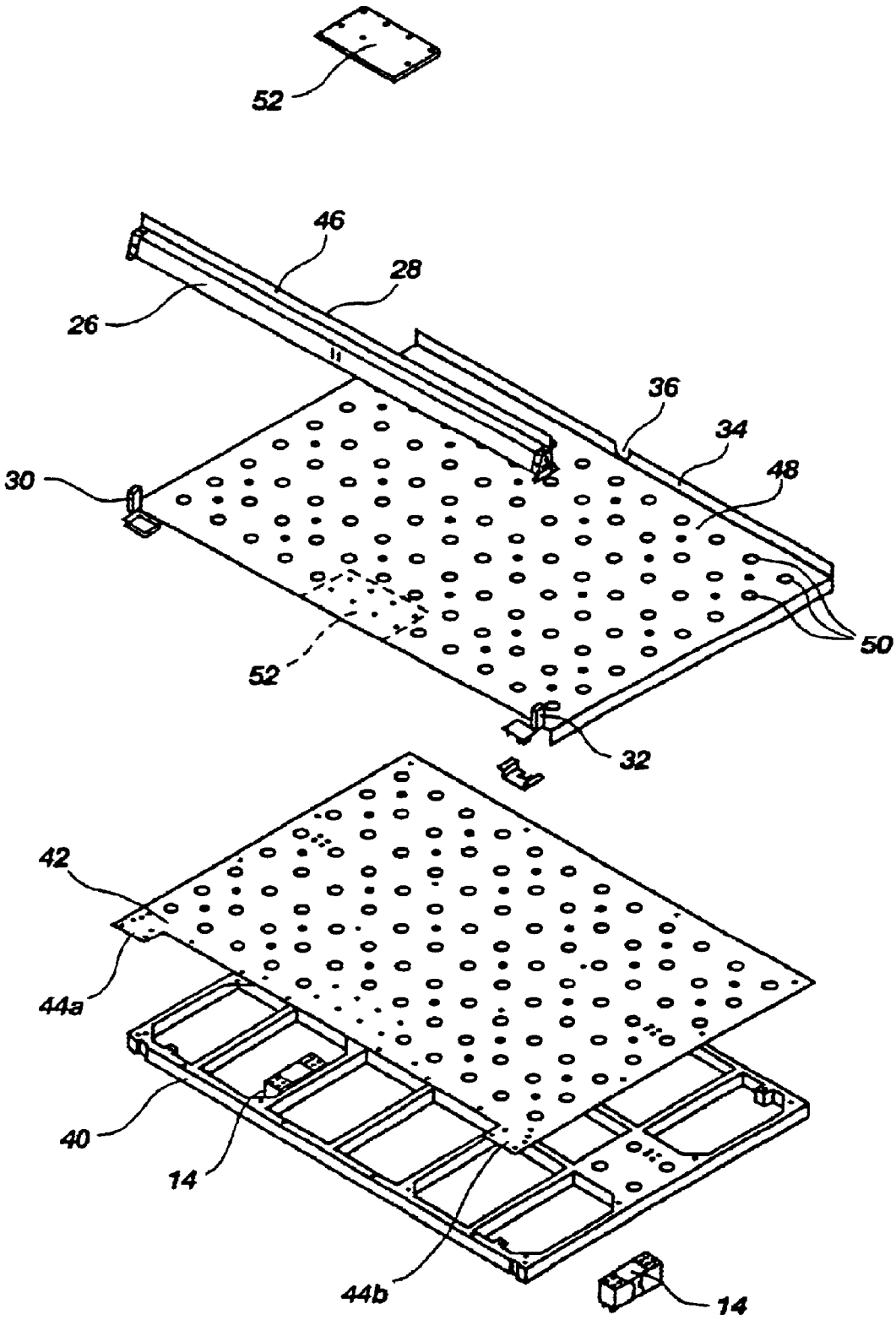
FIG. 5 comprises an exploded perspective view of a platform assembly for the embodiment of FIG. 1.

Referring now to FIG. 5, it may be seen that platform 12 comprises a base frame 40 which rests on and is secured to load cells 14, which may comprise, by way of example, LOC-ISS-300 kg strain gage load cells offered by Celtron Technologies, Inc. of Santa Clara, Calif. Base plate 42 rests on and is secured to base frame 40 and includes first and second extensions 44a and 44b at opposing longitudinal ends thereof which respectively carry third and fourth distance sensors 30 and 32, with associated printed circuit assemblies. Edge housing 26 is secured over third and fourth distance sensors, vertical alignment surface 28 being provided by an upwardly extending flange 46. Roller plate 48 is secured over base plate 42 and carries a plurality of rotatably mounted transfer balls 50 thereon, it being currently preferred that transfer balls 50 comprise one inch diameter steel balls. A polymer plate 52 is secured to the upper surface of roller plate 48 adjacent the edge thereof along which third and fourth sensors 30 and 32 are mounted. The polymer plate 52, as in the case of transfer balls 50, facilitates movement of an object thereacross and provides a flat target surface for reflection of ultrasonic waves during calibration of downwardly facing first distance sensor 20.

Figure 6:
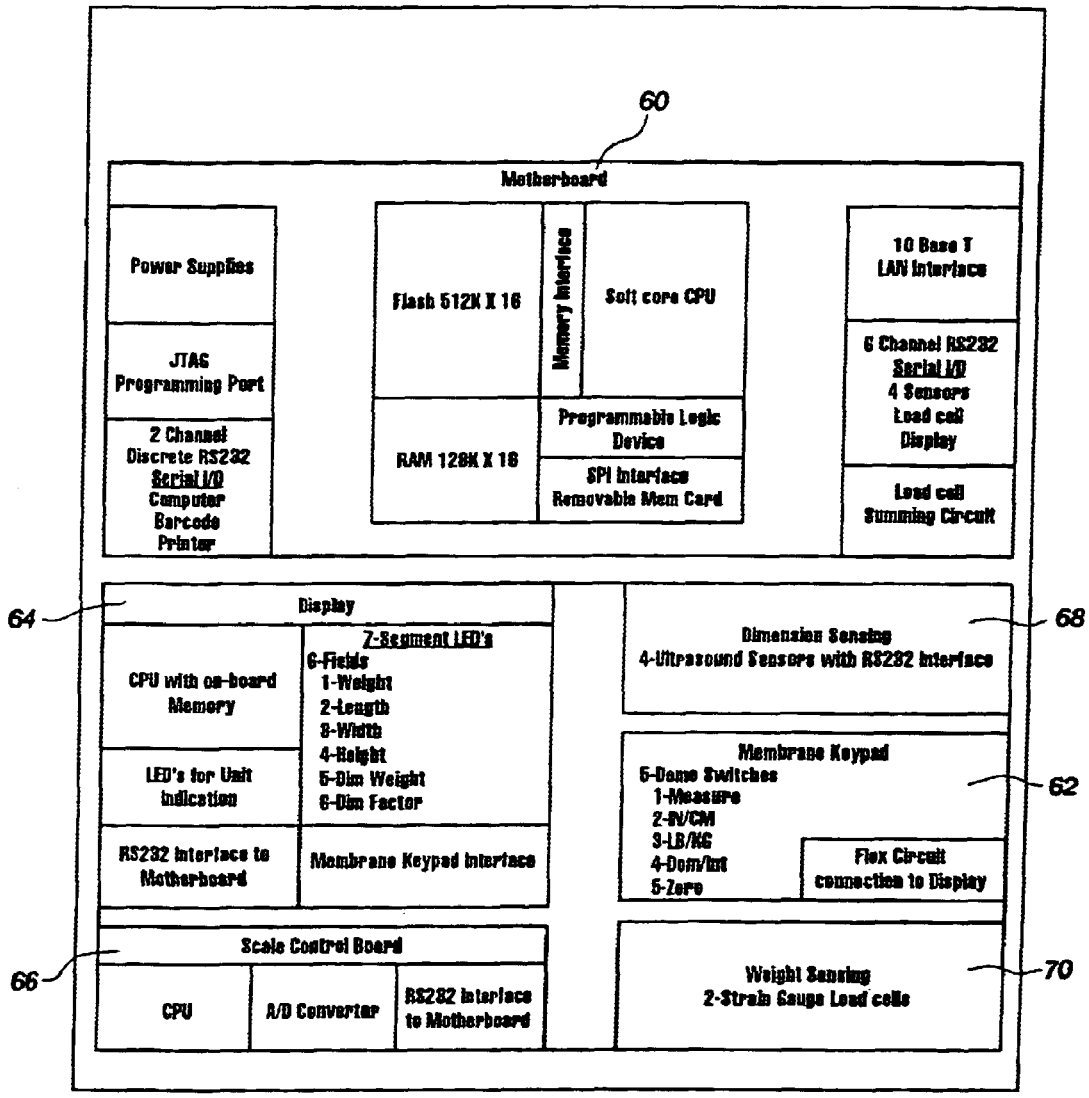
FIG. 6 comprises an electronic component block diagram for the present invention.

Referring again to FIGS. 1, 2 and 3, control panel housing 24 includes a key pad, display and printed circuit assembly 38 for controlling the operating sequence of apparatus 10. FIG. 6 depicts an exemplary block diagram of the electronics for apparatus 10, including motherboard 60, membrane keypad 62, display 64, scale control board 66, dimension-sensing components 68 (including the aforementioned first, second, third and fourth distance sensors 20, 22, 30 and 32) and weight-sensing components 70 (including the aforementioned load cells 14). As electronic components of the types illustrated in FIG. 6 and the configurations thereof are well known to those of ordinary skill in the art and there is no criticality of component selection with respect to implementation of the present invention, no further description thereof is believed to be necessary.

Figure 7:
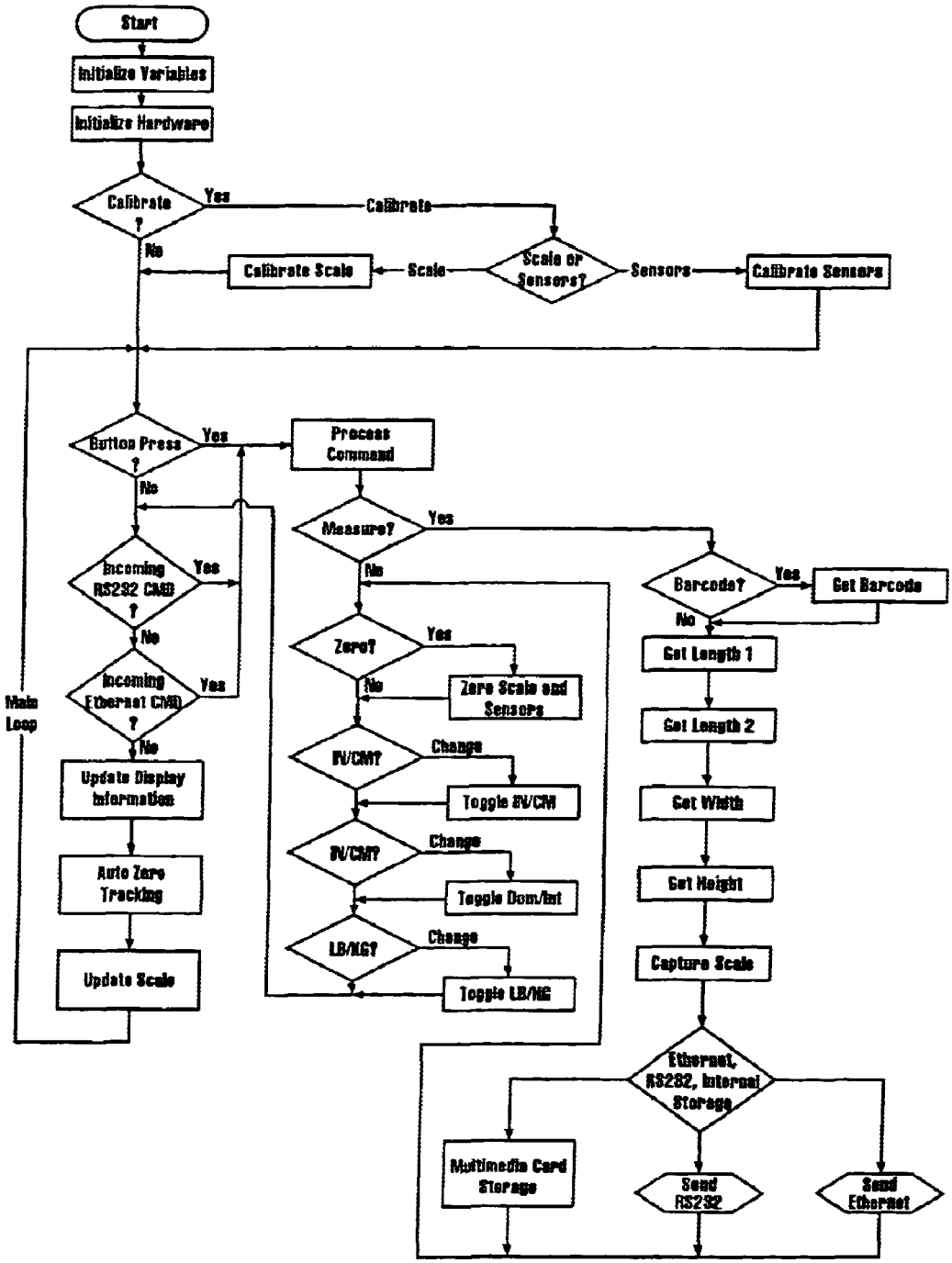
FIG. 7 comprises a flow diagram of the operating sequence of the present invention.

FIG. 7 depicts a flow diagram of an exemplary operating sequence for apparatus 10. It is believed that the flow diagram is self-explanatory as to the initialization, calibration, variable selection and operating sequence of apparatus 10, so no further description thereof is believed to be necessary. As shown, a dimensioning operation may be initiated by a user pressing a button or by receipt by apparatus 10 of a command through a serial or network interface. Similarly, diagnostics may be performed, calibration initiated or other activities initiated or modified remotely through an interface as well as manually. It should be noted, however, that certain quantitative parameters must be selected, or "toggled," for each dimensioning and weighing operation. For example, a user must select inches or centimeters, pounds or kilograms, and either a domestic (194) or international (166) "dim" factor. In addition, the distance sensors and scale may optionally be zeroed before measurements are taken.

Operation of apparatus 10 will now be described with reference to the drawing figures. When a package or other cuboidal object O is to be dimensioned and weighed in accordance with the method of the present invention, an operator may manually move the cuboidal object O from a conveyor assembly, as referenced above, directly onto platform 12 without the necessity of lifting same. Thus, heavy and/or large packages which are difficult to lift and/or to grasp may be speedily moved onto platform 12. As the cuboidal object O is moved onto platform 12, it is moved laterally toward flange 46 providing vertical alignment surface 28 until one side of the cuboidal object O is flat thereagainst and thus parallel to the longitudinal axis L of platform 12. At the same time, the cuboidal object O is longitudinally placed between third and fourth distance sensors 30 and 32 at an appropriate location within a longitudinal dimensioning zone, which may be indicated by a colored area or boundary lines extending laterally across the surface of platform 12.

It is desirable to inhibit measurements in excess of the maximum design dimension to be measured falling in the "near field space" in front of each of the distance sensors 20, 22, 30 and 32, as the travel time of the reflected ultrasonic waves is too short for accurate processing given reaction time lags in the sensors and processing equipment. Therefore, designation of the longitudinal dimensioning zone ensures that the "length" dimension of a cuboidal object O is not too long, and thus renders object sides too close to third and fourth distance sensors 30 and 32.

When the object is properly situated, a barcode thereon may be read by a handheld or overhead sensor and in response to a suitable prompt from apparatus 10, and then the object length measurements by third and fourth distance sensors 30 and 32, followed by the object width measurement by second distance sensor 22 and the object height measurement by first distance sensor 20 are taken. The measurement sequence may be initiated, for example, via a serial command or control panel button by a user of apparatus 10. As noted previously, the object length measurement is effected by subtracting a detected distance between each of the third and fourth distance sensors 30 and 32 and a facing object side from a known distance between third and fourth distance sensors 30 and 32, thus comprising a "differential" length, while the object width and height measurements are effected by subtracting a detected distance between, respectively, second distance sensor 22 and a facing object side from a known, previously detected distance between second distance sensor 22 and vertical alignment surface 28 and a detected distance between first distance sensor 20 and a facing object side from a known, previously detected distance between first distance sensor 20 and the upwardly facing surface of polymer plate 52. The weight of the object is then captured by summing the output of load cells 14. It should be noted that weight is intentionally captured last so that any residual movement or vibration of platform 12 associated with object movement and alignment is attenuated. The dimensional measurements and weight, plus the "dim weight" and the employed "dim factor" (domestic or international) in combination with the barcode identification of the object, may then be forwarded by a serial interface or a network interface to a host computer for further use or may alternatively be saved on removable memory storage such as a multimedia card operably coupled to the motherboard 60.

Figure 8:
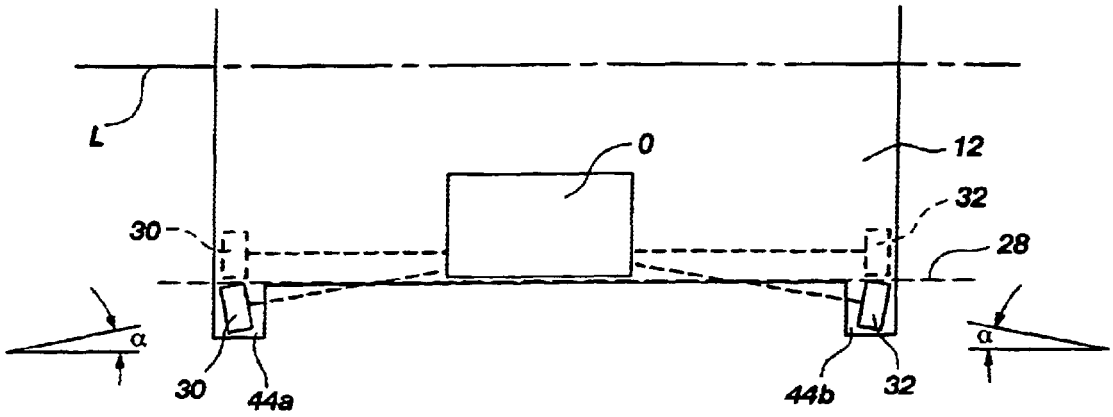
FIG. 8 comprises a top schematic elevation of the placement and orientations of the length sensors used in the embodiment of FIG. 1.

Third and fourth distance sensors 30 and 32, as previously described, are utilized to measure the length of cuboidal object O, "length" being an arbitrary term used in this instance to designate the dimension of a cuboidal object O taken in a direction parallel to longitudinal axis L of platform 12. Distance sensors 30 and 32, as shown in FIG. 8, are each mounted horizontally and substantially parallel to the longitudinal axis L of platform 12 but may be oriented at a slight angle $\propto$ (angle exaggerated for clarity) thereto toward platform 12 so that the ultrasonic beams emitted therefrom will reflect from sides of cuboidal object O. One suitable exemplary, but not limiting, angle $\propto$ is 8°. Distance sensors 30 and 32 as shown are mounted so that they are offset (see also FIG. 5) to the side of platform 12 with which a side of a cuboidal object O has been previously aligned by contact with vertical alignment surface 28, as described above. The slight angular orientation and lateral offset of distance sensors 30 and 32 from platform 12 may be easily compensated for by geometrical calculations. In lieu of offsetting and angling distance sensors 30 and 32, distance sensors 30 and 32 may be mounted as shown in broken lines in FIG. 8 to extend over the surface of platform 12 beyond vertical alignment surface 28 and aimed in an orientation parallel to longitudinal axis L and vertical alignment surface 28, in which instance no compensation for the measured distances is required.

Figure 1:
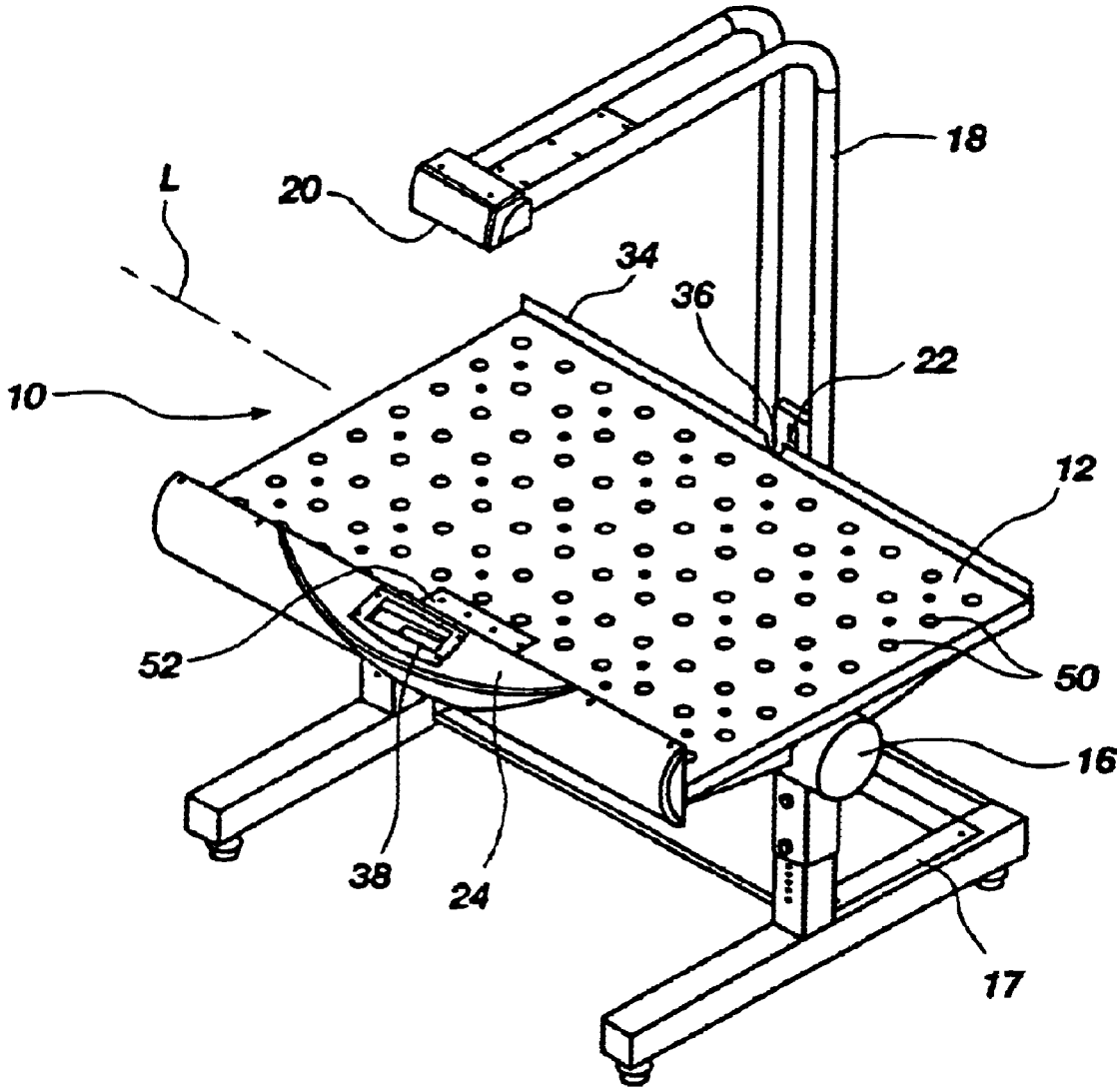
FIG. 1 comprises a perspective view of an exemplary embodiment of the present invention.
Figure 2:
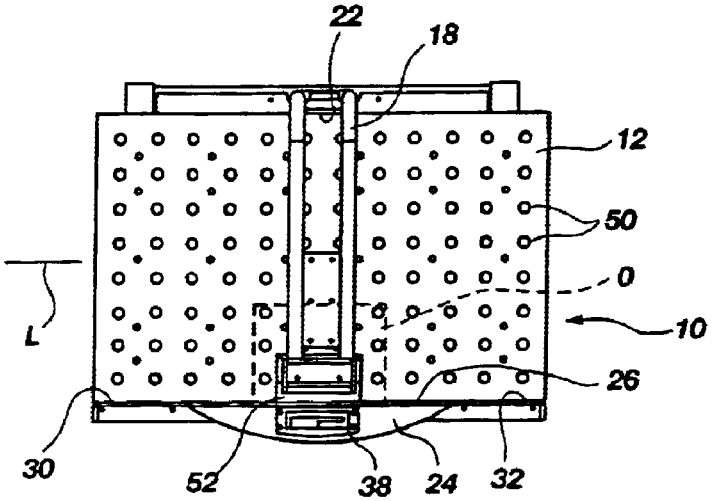
FIG. 2 comprises a top elevation of the embodiment of FIG. 1.
Figure 3:
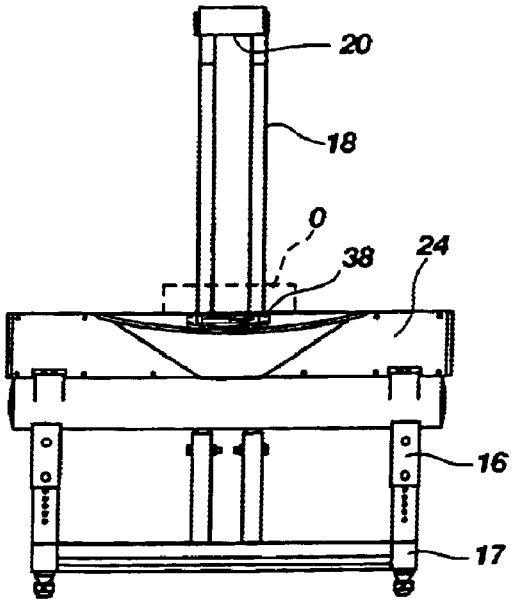
FIG. 3 comprises a side elevation of the embodiment of FIG. 1.

Second distance sensor 22, as shown, is utilized to measure the width of cuboidal object O, "width" being an arbitrary term used in this instance to designate the dimension of a cuboidal object O taken in a direction horizontally perpendicular to the longitudinal axis L of platform 12. Second distance sensor 22 is also mounted in a horizontal attitude to overhead arm unit 18 and to the side of the platform 12 opposite the side thereof where object alignment takes place. Second distance sensor 22 is mounted, as shown in FIG. 1, just high enough above the surface of platform 12 so that its ultrasonic waves will not be reflected by the platform surface but not so high that the waves, which spread in a generally conical pattern from second distance sensor 22 (as with the other distance sensors) with an included angle of 7 to 12 degrees, will miss the shortest (in height) cuboidal object O, such as a small flat object, the width of which is to be measured by apparatus 10. It should be further noted that second distance sensor 22 is mounted in alignment with a notch or cutout 36 in lip 34 (see FIG. 5), so as to better measure, without obstruction, a width of a very short (in height) cuboidal object O.

First distance sensor 20, as shown, is utilized to measure the height of cuboidal object O, "height" being an arbitrary term used in this instance to designate the dimension vertically perpendicular to the longitudinal axis L of platform 12 and to the surface thereof. First distance sensor 20 is mounted downwardly facing in a vertical attitude and preferably adjacent to and to the inside (see FIG. 2) of the side of platform 12 whereat alignment takes place. Of course, first distance sensor 20 is placed above the surface of platform 12 at a height great enough so as to clear the tallest cuboidal object O to be placed on the surface of platform 12 and with adequate near field space therebelow.

Distance sensors 20, 22, 30 and 32 may be calibrated in response to placing a target cuboidal object O of known dimension in the dimensioning zone and in alignment with vertical alignment surface 28 and triggering the distance sensors 20, 22, 30 and 32 in an autocalibration sequence to adjust the output of each of them to correspond to the known values. A one foot cube, twelve inches on a side, may be utilized as a reference. The dimensions of the target cuboidal object measured by sensors 20, 22, 30 and 32 are directly related to travel time of the ultrasonic waves emitted therefrom and reflected from a target surface. Distances from third and fourth sensors 30, 32 may then be geometrically corrected for angle $\propto$ if third and fourth sensors 30, 32 are so oriented (see FIG. 8) to a true distance between each of distance sensors 30 and 32 and the respective facing target surface of the calibration object and subtracted from the known distance between distance sensors 30 and 32.

It should be noted that ultrasonic waves generated by sensors 20, 22, 30 and 32 of the type employed in the present invention are affected in their travel time by temperature, barometric pressure and humidity and that it is therefore desirable to compensate for variations in same when processing the measured travel times. Such compensation can be via lookup tables in a computer memory or by microprocessor correction using known equations for the effects of these variables. However, it is currently preferred to use an auto-zero routine to compensate for these effects. The calibration of the system may be self-commanded upon startup (see FIG. 7) and periodically repeated in response to software commands or, optionally, may be induced periodically by a timer circuit command. Calibration of the ultrasound sensors of the present invention may be readily and repeatedly effected via the use of a battery-backed RAM or flash memory auto-zero system. Operation of the calibration system is shown in flow chart form in FIG. 11 of the aforementioned U.S. Pat. No. 5,105,392, the disclosure of which was previously incorporated herein by reference.

It should be understood that the term "measure" does not necessarily indicate that only a single measurement of each dimension is taken by each distance sensor. In fact, measurements can be taken numerous times in a burst of ultrasonic waves which are emitted, reflected, and received. Utilizing the sensors previously referred to above, dimensional measurements can be taken with apparatus 10 to an accuracy of ±0.1 inches.

It will be appreciated that the low power draw of the present invention, less than one ampere, renders the system easily adaptable to battery power, and, in fact, commercially available, noninterruptable power devices such as are generally used to power lights and equipment during power failures may be employed as power sources for portable installation of the present invention.

It is thus apparent that a novel and unobvious measuring method and apparatus has been described in a variety of embodiments. Many additions, deletions, and modifications to the preferred embodiments may be made without departing from the scope of the invention as hereafter claimed.

What is claimed is:

[1. An apparatus for determining dimensions of a cuboidal object, comprising:

a longitudinally extending platform having a surface;

a first, downwardly facing distance sensor disposed above the surface of the platform;

a second distance sensor at one side of the platform and facing laterally thereacross; and third and fourth distance sensors disposed along a longitudinal edge of an opposing side of the platform from the one side, the third and fourth distance sensors, substantially facing each other and facing substantially along the longitudinal edge of the opposing side.]

[2. The apparatus of claim 1, further comprising a longitudinally extending, vertical alignment surface located along the opposing side of the platform.]

[3. The apparatus of claim 2, wherein the vertical alignment surface is carried by the platform.]

[4. The apparatus of claim 1, wherein the third and fourth distance sensors are oriented parallel or at an acute angle to a longitudinal axis of the platform.]

[5. The apparatus of claim 1, wherein the third and fourth distance sensors are carried by the platform.]

[6. The apparatus of claim 1, wherein the first distance sensor is carried by an arm extending over the platform.]

[7. The apparatus of claim 6, wherein the second distance sensor is carried by a substantially vertically extending portion of the arm disposed at the one side of the platform.]

[8. The apparatus of claim 1, wherein the first, second, third and fourth distance sensors are selected from the group consisting of ultrasonic sensors and laser rangefinder sensors.]

[9. The apparatus of claim 1, wherein the platform is supported on a support assembly by at least one device for measuring weight.]

[10. The apparatus of claim 9, wherein the at least one device for measuring weight comprises at least one load cell.]

[11. The apparatus of claim 10, wherein the at least one load cell comprises two longitudinally spaced load cells.]

[12. The apparatus of claim 9, further including a processor for calculating a spatial volume and a dim weight of the cuboidal object.]

[13. The apparatus of claim 1, wherein the platform surface carries a plurality of substantially equal diameter, rotatably mounted elements protruding therefrom.]

[14. The apparatus of claim 1, further including a processor for calculating a spatial volume of the cuboidal object.]

[15. The apparatus of claim 1, further comprising a barcode reader.]

[16. A method for determining dimensions of a cuboidal object, comprising:

placing a cuboidal object on a surface of a platform;

aligning mutually perpendicular sides of the cuboidal object to be respectively substantially perpendicular to a downwardly facing first distance sensor, a second distance sensor facing across the platform from one side thereof, and third and fourth distance sensors facing opposing, mutually parallel sides of the cuboidal object perpendicular to the one side thereof;

aligning a side of the cuboidal object parallel with the one side thereof with an alignment surface opposing the second distance sensor;

determining a height of the cuboidal object by determining a first distance between the first distance sensor and the top of the cuboidal object and subtracting the determined first distance from a known distance between the first distance sensor and the platform surface;

determining a width of the cuboidal object by determining a second distance between the second distance sensor and the one side of the cuboidal object and subtracting the determined second distance from a known distance between the second distance sensor and the alignment surface; and determining a length of the cuboidal object by respectively determining third and fourth distances between the third and fourth distance sensors and the opposing, mutually parallel sides of the cuboidal object and subtracting the third and fourth determined distances from a known distance between the third and fourth sensors.]

[17. The method of claim 16, wherein determining the length, width and height of the cuboidal object is effected using an ultrasonic distance sensor or a laser rangefinder distance sensor to measure the first, second, third and fourth distances.]

[18. The method of claim 16, further comprising determining a weight of the cuboidal object substantially concurrently with determining the length, width and height thereof.]

[19. The method of claim 18, further comprising calculating a spatial volume of the cuboidal object from the determined length, width and height and a dim weight for the cuboidal object from the calculated spatial volume, determined weight and a preselected dim weight factor.]

[20. The method of claim 16, further comprising calculating a spatial volume of the cuboidal object from the determined length, width and height.]

[21. An apparatus for determining dimensions of a cuboidal object, comprising:

a platform having a surface;

a first, downwardly facing distance sensor disposed above the surface of the platform and carried by an arm extending thereover;

a second distance sensor at one side of the platform and facing laterally thereacross, the second distance sensor being carried by a substantially vertically extending portion of the arm disposed at the one side of the platform; and third and fourth distance sensors substantially facing each other and facing substantially longitudinally along an opposing side of the platform from the second distance sensor.]

[22. The method of claim 16, wherein placing the cuboidal object on the platform comprises moving the cuboidal object onto the platform from a surface of a conveyor assembly of substantially the same height as the surface of the platform.]

[23. An apparatus for determining dimensions of a cuboidal object, comprising:

a platform having a surface;

a first, downwardly facing distance sensor disposed above the surface of the platform;

a second distance sensor at one side of the platform and facing laterally thereacross;

third and fourth distance sensors substantially facing each other and facing substantially longitudinally along an opposing side of the platform from the second distance sensor; and a longitudinally extending, vertical alignment surface located along the opposing side of the platform.]

[24. The apparatus of claim 23, wherein the vertical alignment surface is carried by the platform.]

[25. The apparatus of claim 23, wherein the third and fourth distance sensors are oriented parallel or at an acute angle to a longitudinal axis of the platform.]

[26. The apparatus of claim 23, wherein the third and fourth distance sensors are carried by the platform.]

[27. The apparatus of claim 23, wherein the first distance sensor is carried by an arm extending over the platform.]

[28. The apparatus of claim 27, wherein the second distance sensor is carried by a substantially vertically extending portion of the arm disposed at the one side of the platform.]

[29. The apparatus of claim 23, wherein the first, second, third and fourth distance sensors are selected from the group consisting of ultrasonic sensors and laser rangefinder sensors.]

[30. The apparatus of claim 23, wherein the platform is supported on a support assembly by at least one device for measuring weight.]

[31. The apparatus of claim 30, wherein the at least one device for measuring weight comprises at least one load cell.]

[32. The apparatus of claim 30, further including a processor for calculating a spatial volume and a dim weight of the cuboidal object.]

[33. The apparatus of claim 23, further including a processor for calculating a spatial volume of the cuboidal object.]

[34. The apparatus of claim 23, further comprising a barcode reader.]

[35. An apparatus for determining dimensions of a cuboidal object, comprising:

a platform having a surface;

a support assembly supporting the platform, the support assembly comprising two longitudinally spaced load cells for measuring weight;

a first, downwardly facing distance sensor disposed above the surface of the platform;

a second distance sensor at one side of the platform and facing laterally thereacross; and third and fourth distance sensors substantially facing each other and facing substantially longitudinally along an opposing side of the platform from the second distance sensor.]

[36. An apparatus for determining dimensions of a cuboidal object, comprising:

a platform having a surface;

a plurality of substantially equal diameter, rotatably mounted elements protruding from the platform surface;

a first, downwardly facing distance sensor disposed above the surface of the platform;

a second distance sensor at one side of the platform and facing laterally thereacross; and third and fourth distance sensors substantially facing each other and facing substantially longitudinally along an opposing side of the platform from the second distance sensor.]

*37. An apparatus for determining dimensions of a cuboidal object, comprising:*

*a longitudinally extending stationary platform having a surface and a longitudinal axis;*

*a first, downwardly facing distance sensor disposed above the surface of the platform;*

*a second distance sensor at one side of the platform and facing laterally thereacross;*

*third and fourth distance sensors disposed along a longitudinal edge of an opposing side of the platform from the one side and on longitudinally opposing sides of the second distance sensor, the third and fourth distance sensors substantially facing each other and facing substantially along the longitudinal edge of the opposing side in a direction parallel to the longitudinal axis; and*

*a longitudinally extending, vertical alignment surface located along the opposing side of the platform longitudinally between the third and fourth distance sensors.*

*38. The apparatus of claim 37, wherein the vertical alignment surface is carried by the platform.*

*39. The apparatus of claim 37, wherein the third and fourth distance sensors are oriented parallel to a longitudinal axis of the platform.*

*40. The apparatus of claim 37, wherein the third and fourth distance sensors are carried by the platform.*

*41. The apparatus of claim 37, wherein the first distance sensor is carried by an arm extending over the platform.*

*42. The apparatus of claim 41, wherein the second distance sensor is carried by a substantially vertically extending portion of the arm disposed at the one side of the platform.*

*43. The apparatus of claim 37, wherein the first, second, third and fourth distance sensors are selected from the group consisting of ultrasonic sensors and laser rangefinder sensors.*

*44. The apparatus of claim 37, wherein the platform is supported on a support assembly by at least one device for measuring weight.*

*45. The apparatus of claim 44, wherein the at least one device for measuring weight comprises at least one load cell.*

*46. The apparatus of claim 45, wherein the at least one load cell comprises two longitudinally spaced load cells.*

*47. The apparatus of claim 44, further including a processor for calculating a spatial volume and a dim weight of the cuboidal object.*

*48. The apparatus of claim 37, wherein the platform surface carries a plurality of substantially equal diameter, rotatably mounted elements protruding therefrom.*

*49. The apparatus of claim 37, further including a processor for calculating a spatial volume of the cuboidal object.*

*50. The apparatus of claim 37, further comprising a barcode reader.*

*51. A method for determining dimensions of a cuboidal object, comprising:*

*placing a cuboidal object on a surface of a longitudinally extending, stationary platform;*

*aligning mutually perpendicular sides of the cuboidal object to be respectively substantially perpendicular to a downwardly facing first distance sensor;*

*locating the cuboidal object on the stationary platform across from a second distance sensor facing across the stationary platform from one side thereof and longitudinally between third and fourth longitudinally spaced, mutually facing distance sensors facing opposing, mutually parallel side of the cuboidal object perpendicular to the one side thereof;*

*aligning a side of the cuboidal object parallel with the one side thereof with an alignment surface opposing the second distance sensor, contacting the side of the cuboidal object with the alignment surface, and locating the side of the cuboidal object adjacent an edge of the stationary platform between the third and fourth distance sensors, the third and frouth distance sensors respectively facing opposing, mutually parallel sides of the cuboidal object perpendicular to the one side thereof;*

*determining a height of the cuboidal object by determining a first distance between the first distance sensor and the top side of the cuboidal object aligned substantially perpendicular to the downwardly facing first distance sensor and subtracting the determined first distance from a known distance between the first distance sensor and the platform surface;*

*determining a width of the cuboidal object by determining a second distance between the second distance sensor and the one side of the cuboidal object and subtracting the determined second distance from a known distance between the second distance sensor and the alignment surface; and*

*determining a length of the cuboidal object by respectively determining third and fourth distances between the third and fourth distance sensors and the opposing, mutually parallel sides of the cuboidal object and subtracting the third and fourth determined distances from a known distance between the third and fourth sensors.*

*52. The method of claim 51, wherein determining the length, width and height of the cuboidal object is effected using an ultrasonic distance sensor or a laser rangefinder distance sensor to measure the first, second, third and fourth distances.*

*53. The method of claim 51, further comprising determining a weight of the cuboidal object substantially concurrently with determining the length, width and height thereof.*

*54. The method of claim 53, further comprising calculating a spatial volume of the cuboidal object from the determined length, width and height and a dim weight for the cuboidal object from the calculated spatial volume, determined weight and a preselected dim weight factor.*

*55. The method of claim 51, further comprising calculating a spatial volume of the cuboidal object from the determined length, width and height.*

*56. An apparatus for determining dimensions of a cuboidal object, comprising:*

*a longitudinally extending, stationary platform having a surface;*

*a first, downwardly facing distance sensor disposed above the surface of the platform and carried by an arm extending thereover;*

*a second distance sensor at one side of the platform and facing laterally thereacross, the second distance sensor being carried by a substantially vertically extending portion of the arm disposed at the one side of the platform; and*

*third and fourth distance sensors substantially facing each other and facing substantially longitudinally along an opposing side of the platform from the second distance sensor, the second distance sensor being located longitudinally between the third and fourth distance sensors.*

*57. The method of claim 51, wherein placing the cuboidal object on the platform comprises moving the cuboidal object onto the platform from a surface of a conveyor assembly of substantially the same height as the surface of the platform.*

*58. An apparatus for determining dimensions of a cuboidal object, comprising:*

*a longitudinally extending, stationary platform having a surface;*

*a first, downwardly facing distance sensor disposed above the surface of the platform;*

*a second distance sensor at one side of the platform longitudinally between third and fourth distance sensors and facing laterally across the platform;*

*the third and fourth distance sensors substantially facing each other and facing substantially longitudinally along an opposing side of the platform from the second distance sensor; and*

*a longitudinally extending, vertical alignment surface located along the opposing side of the platform and between the third and fourth distance sensors.*

*59. The apparatus of claim 58, wherein the vertical alignment surface is carried by the platform.*

*60. The apparatus of claim 58, wherein the third and fourth distance sensors are oriented parallel or at an acute angle to a longitudinal axis of the platform.*

*61. The apparatus of claim 58, wherein the third and fourth distance sensors are carried by the platform.*

*62. The apparatus of claim 58, wherein the first distance sensor is carried by an arm extending over the platform.*

*63. The apparatus of claim 62, wherein the second distance sensor is carried by a substantially vertically extending portion of the arm disposed at the one side of the platform.*

*64. The apparatus of claim 58, wherein the first, second, third and fourth distance sensors are selected from the group consisting of ultrasonic sensors and laser rangefinder sensors.*

*65. The apparatus of claim 58, wherein the platform is supported on a support assembly by at least one device for measuring weight.*

*66. The apparatus of claim 65, wherein the at least one device for measuring weight comprises at least one load cell.*

*67. The apparatus of claim 65, further including a processor for calculating a spatial volume and a dim weight of the cuboidal object.*

*68. The apparatus of claim 58, further including a processor for calculating a spatial volume of the cuboidal object.*

*69. The apparatus of claim 58, further comprising a barcode reader.*

*70. An apparatus for determining dimensions of a cuboidal object, comprising:*

*a longitudinally extending, stationary platform having a surface;*

*a support assembly supporting the platform, the support assembly comprising two longitudinally spaced load cells for measuring weight;*

*a first, downwardly facing distance sensor disposed above the surface of the platform;*

*a second distance sensor at one side of the platform and facing laterally thereacross; and*

*third and fourth distance sensors substantially facing each other on longitudinally opposing sides of the second distance sensor and facing substantially longitudinally along a laterally opposing side of the platform from the second distance sensor.*

*71. An apparatus for determining dimensions of a cuboidal object, comprising:*

*a platform having a stationary surface;*

*a plurality of substantially equal diameter, rotatably mounted elements protruding from the platform surface;*

*a first, downwardly facing distance sensor disposed above the surface of the platform;*

*a second distance sensor at one side of the platform and facing laterally thereacross; and*

*third and fourth distance sensors substantially facing each other, longitudinally flanking the second distance sensor and facing substantially longitudinally along a laterally opposing side of the platform from the second distance sensor.*

* * * * *